United States Patent [19]
Denis

[11] 3,990,306
[45] Nov. 9, 1976

[54] TEMPERATURE COMPENSATED DEPTH GAUGE FOR SCUBA DIVING

[75] Inventor: David R. Denis, Azusa, Calif.

[73] Assignee: Under Sea Industries, Inc., Compton, Calif.

[22] Filed: Jan. 20, 1975

[21] Appl. No.: 542,446

[52] U.S. Cl. .................................. 73/300; 73/393
[51] Int. Cl.² ........................................ G01L 19/04
[58] Field of Search ..................... 73/300, 393; 92/1

[56] References Cited
UNITED STATES PATENTS

| | | | |
|---|---|---|---|
| 2,659,390 | 11/1953 | Mac Lea et al. | 73/393 |
| 2,935,873 | 5/1960 | Stewart | 73/300 |
| 3,203,244 | 8/1965 | Alinari | 73/300 |

*Primary Examiner*—James J. Gill
*Assistant Examiner*—Anthony V. Ciarlante
*Attorney, Agent, or Firm*—Flam & Flam

[57] ABSTRACT

A scuba diving oil filled depth gauge has a rigid or semi-rigid case that houses operative depth gauge elements. Outside pressure is communicated to the inside oil through a rolling diaphragm made of thin and highly flexible rubber-like material. The expansion and contraction of the oil due to thermal and other effects produces compensation at the rolling diaphragm without the imposition of stresses whereby a true communication of external to internal pressure is accomplished for accurate reading of the gauge.

5 Claims, 3 Drawing Figures

U.S. Patent  Nov. 9, 1976  3,990,306
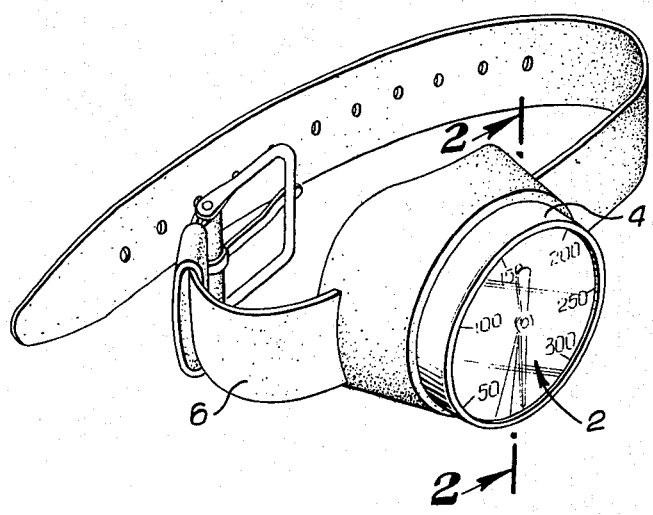
Fig. 1.
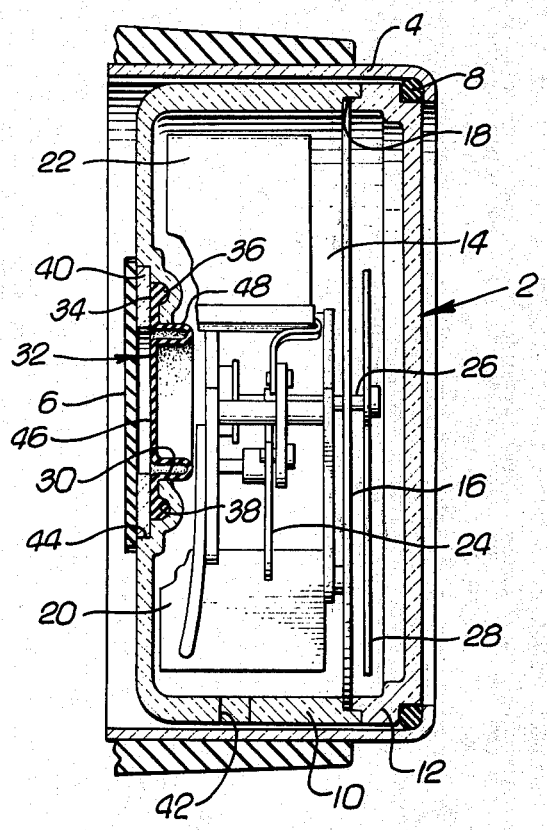
Fig. 2.
Fig. 3.

TEMPERATURE COMPENSATED DEPTH GAUGE FOR SCUBA DIVING

FIELD OF INVENTION

This invention relates to depth gauges for diving purposes, namely an instrument that indicates the distance that a diver is from the surface of the water.

DISCUSSION OF PRIOR ART

Since the water pressure increases substantially as a linear function of depth, a pressure gauge becomes a depth gauge when its scale reads in feet or meters instead of pounds per square inch. Pressure gauges of the type devised by Eugene Bourdon (U.S. Pat. No. 9,163, issued Aug. 3, 1852) have here been widely used.

The basic consideration in the design of depth gauges is to seal the delicate moving parts and, at the same time, to subject the contained Bourdon gauge parts to the ambient pressure. In order best to protect the mechanical parts and at the same time to provide antifriction characteristics, it has been proposed to fill the case or housing with caster oil, glycerine or other suitable inert lubricating oil. See. U.S. Pat. No. 2,935,873 to Stewart entitled DIVER HELD DEPTH GAUGE. Carlo Alinari of Turin, Italy (U.S. Pat. No. 3,203,224, entitled DEPTH METER FOR DIVING PURPOSES) designed such an oil filled depth gauge that has met with substantial commercial success in the United States as well as other markets. More recently, Carlo Alinari has suggested a simplified version of his depth gauge in which the casing is formed by two transparent flexible plastic cups or shell parts fused, welded, or otherwise sealed together along the registering edges. In such an organization the flexible characteristics of the housing elements serve to transmit the external pressure to the inside of the case for suitable deflection of the Bourdon gauge.

Notwithstanding many sophisticated advances in the scuba diving art, depth gauges have been crude and notoriously inaccurate. One main reason is that the oil within the depth gauge casing has a thermal expansion character. The oil tends to contract as the temperature lowers. Other parts of the gauge change and provide positive and negative displacements. The operative flex element, be it the case itself or the diaphragm, becomes stressed and there is no longer equilibrium.

The obvious solution is to find a lubricating oil that has a near zero temperature expansible coefficient. Another solution would be to build case parts having a negative temperature coefficient of expansion that would maintain the volume of the case constant notwithstanding temperature fluctuations. The simplest solution, however, has thus far escaped those skilled in the art. The object of the present invention is to provide the simplest conceivable oil filled depth gauge that is compensated for temperature and other variables that affect volume of the fill fluid.

SUMMARY OF THE INVENTION

In order to achieve the foregoing object, I provide a substantially rigid case, preferably made of transparent plastic, having a free rolling diaphragm forming a part of one wall thereof. The diaphragm is, at normal air temperature, cupped inwardly, but not to its fullest normal extent, such that upon contraction at low temperatures, the cup rolls freely inwardly to provide perfect compensation. Virtually no stress whatsoever is imposed upon the diaphragm whatever the thermal conditions may be. At the same time, the cupped diaphragm serves to transmit the external ambient pressure to the inside of the case for operation upon the Bourdon gauge.

BRIEF DESCRIPTION OF THE DRAWINGS

A detailed description of the invention will be made with reference to the accompanying drawings wherein like numerals designate corresponding parts in the several figures. These drawings, unless described as diagrammatic, or unless otherwise indicated, are to scale.

FIG. 1 is a pictorial view of the depth gauge and wrist carrier therefor.

FIG. 2 is an enlarged sectional view taken along the plane corresponding to line 2—2 of FIG. 1.

FIG. 3 is a fragmentary rear elevational view of the depth gauge.

DETAILED DESCRIPTION OF THE PREFERRED EMBODIMENT:

The following detailed description is of the best presently contemplated mode of carrying out the invention. This description is not to be taken in a limiting sense, but is made merely for purposes of illustrating the general principles of the invention since the scope of the invention is best defined by the appended claims.

In FIG. 1 there is illustrated a depth gauge capsule 2 designed to fit a wrist carrier. The carrier comprises a protective thin metal jacket 4 into which the capsule 2 is adapted to be fitted. A strap 6 threads through holes in the rear of the jacket to hold the capsule in place. The capsule 2 is cushioned between the strap 6, which may be made of rubber-like material, and an O-ring 8 located inside of the front flange of the jacket.

The capsule comprises two shell parts 10 and 12 together providing a generally cylindrical space 14 for accommodating the operative elements of the gauge. These operative elements are mounted on a circular face plate 16. The edge of the face plate 16 fits an internal groove 18 at the registering ends of the capsule parts. When these parts are welded or fused together, the face plate 16 is clamped in place.

The operative elements of the gauge are: a support 20; an arcuate Bourdon tube 22 with one end mounted on the support 20; a linkage 24 connected to the distal end of the Bourdon tube 22 (including a gear segment and a pinion mounted upon a pointer shaft 26); and a pointer 28 connected to the shaft 26 and located on the outer visible side of the face plate 16. The parts thus described are conventional.

The bottom wall of the capsule part 10 has an inwardly offset portion opposite the face plate. This section has a central opening 30 closed by a thin rolling diaphragm 32. The diaphragm 32 has a peripheral mounting rim or flange 34 provided with an annular bead 36 that fits a corresponding outwardly facing annular recess 38 located near the edge of the opening 30. The bead 36 is tightly and sealingly engaged with the recess 38. For this purpose, a plastic retainer ring 40 overlies the diaphragm flange 34 and fits a shallow recess 44 provided therefor by the capsule part 10. The retaining ring 40 is solvent or ultrasonically welded to the capsule while the bead 36 is stressed. Upon assembly, none of the parts projects beyond the boundary plane of the case part 10.

With the case parts 10 and 12, the gauge plate 16 and the rolling diaphragm 32 assembled, the capsule is filled with suitable inert lubricating oil, preferably having a low, but not necessarily zero, temperature expansible coefficient. Preferably, the oil is nearly incompressible. A fill hole 42 is provided for oil which is plugged after all air is bled off.

The capsule is filled to such an extent that the central flat portion 46 of the rolling diaphragm 32 is located in a plane just inside the boundary plane of the capsule part 10. The central part 46 is joined to the mounting flange 32 by a rolled section 48. The rolled section 48 is essentially tubular with one end convoluted or folded inwardly where it joins the central flat part 46 and with the other end joined to the flange part 34.

The diaphragm 32, and more particularly, the rolled section 48 and flat part 46 are made of extremely thin and extremely flexible durable rubber-like impermeable material. The central part 46 is capable of moving inwardly to the point where the fold of the rolled section 48 nearly disappears. This corresponds to a substantial percentage volume change. This compensates for the contractions and expansions of the oil whatever the cause, all without the addition of any stress on the central portion of the diaphragm itself. Accordingly the pressure outside of the gauge is truly communicated to the oil inside the gauge whereby an accurate pressure or depth reading is obtained. The diaphragm furthermore compensates for shifts or displacements due to expansion and contraction of the Bourdon tube itself and of the case parts 10 and 12. Pressure is fully and truly equalized in a manner never heretofore attained in scuba diving depth gauges.

Intending to claim all novel, useful and unobvious features shown or described, I make the following claims:

1. In an oil filled depth gauge for scuba divers:
   a. a sealed case made of rigid or semi-rigid material;
   b. operative depth gauge parts housed in said case, including a pressure sensing element, indicator means and a connection between the sensing element and indicator means;
   c. an inert oil-like substance substantially entirely filling said case, said oil having a thermal expansion characteristic greater than zero so that said oil expands and contracts;
   d. said case having an opening;
   e. an edge-clamped free rolling diaphragm closing said case opening, and made of thin, highly flexible rubber-like material and movable in the absence of a spring constant and in the absence of stress in a path inwardly of said case in accordance with the volumetric shifts and/or changes of said inert oil to compensate for the thermal expansion of said inert oil while retaining precise pressure equilibrium between the inside and the outside of said case.

2. The oil filled depth gauge for scuba divers as set forth in claim 1 in which said diaphragm has an intermediate generally tubular portion rolled back or convoluted upon itself.

3. The oil filled depth gauge for scuba divers as set forth in claim 2 in which said diaphragm has a beaded edge fitting a mating outwardly facing recess in the wall of said case, and a clamping ring overlying said beaded edge and permanently affixed to said case.

4. The oil filled depth gauge for scuba divers as set forth in claim 3 in which said case is generally cylindrical with said indicator means located at one end wall thereof and said opening located at the other end wall having an inwardly offset part at which said outwardly facing recess is located as well as a recess for accommodating said clamping ring whereby said clamping ring is flush with said other wall; said rolled diaphragm part being normally located slightly inside the bounding plane of said other wall so that it does not protrude beyond said other end wall during its course of compensating movement.

5. The oil filled depth gauge for scuba divers as set forth in claim 2 in which said rolled back or convoluted tubular part projects to the inside of said case throughout the course of compensating movement of said diaphragm.

* * * * *